(12) United States Patent
Kidder

(10) Patent No.: US 6,711,471 B2
(45) Date of Patent: Mar. 23, 2004

(54) ZONE OF GREATEST DEMAND CONTROLLER, APPARATUS, AND METHOD

(75) Inventor: Kenneth B. Kidder, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 49 days.

(21) Appl. No.: 10/104,159

(22) Filed: Mar. 22, 2002

(65) Prior Publication Data

US 2003/0182021 A1 Sep. 25, 2003

(51) Int. Cl.⁷ ............................................... G06F 19/00
(52) U.S. Cl. ....................................... 700/276; 700/277
(58) Field of Search ................................ 700/276, 277; 165/12

(56) References Cited

U.S. PATENT DOCUMENTS

| | | | |
|---|---|---|---|
| 3,838,733 A | 10/1974 | Erlandson | 165/22 |
| 3,842,243 A | 10/1974 | Gregory | 219/497 |
| 4,174,064 A | 11/1979 | Pratt, Jr. | 236/1 B |
| 4,364,512 A | 12/1982 | Morrison | 236/9 A |
| 4,501,125 A | 2/1985 | Han | 62/175 |
| 4,530,395 A | 7/1985 | Parker et al. | 165/16 |
| 4,539,896 A | 9/1985 | Thomas | 98/1 |
| 5,024,265 A * | 6/1991 | Buchholz et al. | 165/217 |
| 5,303,767 A * | 4/1994 | Riley | 165/208 |
| 5,318,104 A * | 6/1994 | Shah et al. | 165/208 |
| 6,206,092 B1 | 3/2001 | Beck et al. | 165/203 |

\* cited by examiner

Primary Examiner—Leo Picard
Assistant Examiner—Michael D. Masinick

(57) ABSTRACT

A controller, multiple zone control apparatus, and method for controlling temperature independently in each zone for use in a structure having an interior divided into a plurality of zones. The controller is constructed and arranged to control the temperature in each zone by actuating a temperature effecting device to communicate a temperature conditioned fluid to the zone. The controller is constructed and arranged to determine a zone temperature error for each of the zones based upon the difference between a predetermined temperature and the temperature represented by a signal sent from a sensor located in the zone in which the error is to be determined. The controller also is constructed and arranged to compare the errors of a plurality of zones to determine the zone of greatest error. The controller has a predetermined on/off cycle for each zone for actuating the temperature effecting device such that when the cycle is in an "on" condition, the temperature effecting device communicates fluid to the zone and when the cycle is in an "off" condition, then the device does not communicate fluid to the zone. The controller is constructed and arranged to actuate the temperature effecting device when the on/off cycle of the zone of greatest error dictates such actuation. The controller also has a synchronizing mechanism to synchronize the on/off cycles of each zone when a predetermined triggering event occurs.

13 Claims, 1 Drawing Sheet

ZONE OF GREATEST DEMAND CONTROLLER, APPARATUS, AND METHOD

BACKGROUND OF THE INVENTION

The present invention generally relates to the field of control apparatus. Specifically, the present invention relates to the field of controllers and apparatus for the control of temperature in a plurality of zones.

Traditionally, heating and cooling of structures, such as residential and commercial buildings was accomplished by a system of vents or pipes, connected to a central unit, which routed a fluid, such as air or a liquid, to the different spaces within the structure, wherein the analysis of whether heat or cooling was necessary, was determined by a single sensor.

Today, some systems have at least one sensor in each space, or in a plurality of spaces, to facilitate different temperature conditioning of the different spaces, thereby allowing the spaces to have different temperatures. Some of these apparatus may simply moderate the flow of fluid to the spaces by turning a fan or pump on and off, or by changing the speed of the fan or pump. Alternatively, many apparatus typically have one or more valves or dampers connected to each conduit, through which the fluid is communicated to the spaces, that are adjustable to help disperse the correct amount of conditioned fluid into the space.

Although some apparatus have several controllers that determine when and where to disperse the conditioned fluid, many apparatus are devised with a central controller that controls the conditioning of all of the spaces through the processing of data obtained by the plurality of sensors within each of the spaces.

Initially, these apparatus had problems with the control of the conditioning unit that supplies the conditioned fluid to the spaces because the demand for conditioning resulted in short breaks between its run times, thereby reducing the effectiveness and longevity of the unit.

Recently, apparatus have been developed that incorporated a method for determining the conditioning demand in the space having the greatest demand for conditioning and utilized the requirements of this space to dictate when the conditioning device was actuated. In a further improvement upon this principle, other apparatus have been developed that, while utilizing the zone of greatest demand to dictate when the conditioning device was actuated, the apparatus synchronized the distribution of fluid to all zones to coincide with the actuation of the conditioning device, thereby conditioning all zones needing conditioning during the same period. This system is more efficient and reduces the wear and tear of the conditioning device and, thereby, increases the longevity of the system by reducing the amount of time the device is running and by reducing the amount of short breaks between run times.

Although this approach has been successful, the present invention discloses another more sophisticated and improved solution to this problem.

SUMMARY OF THE INVENTION

The present invention further refines the idea of utilizing zone control to reduce the run time of the conditioning device and to further reduce the amount of short breaks between running periods. The present invention includes a controller, multiple zone control apparatus, and method for controlling temperature independently in each zone, for use in a structure having an interior divided into a plurality of zones.

The controller is constructed and arranged to control the temperature in each zone by actuating a temperature-affecting device to communicate a temperature conditioned fluid to the zone. The controller is constructed and arranged to determine a zone temperature error for each of the zones based upon the difference between a predetermined temperature and the temperature represented by a signal sent from a sensor located in the zone in which the error is to be determined. The controller also is constructed and arranged to compare the errors of a plurality of zones to determine the zone with the greatest of the errors among these zones. The controller has a predetermined on/off cycle for each zone for actuating the temperature-affecting device such that when the cycle is in an "on" condition, the temperature-affecting device communicates fluid to the zone and when the cycle is in an "off" condition, the device does not communicate fluid to the zone. The controller is constructed and arranged to actuate the temperature-affecting device when the on/off cycle of the zone of greatest error or demand dictates such actuation.

The controller also has a synchronizing mechanism to synchronize the on/off cycles of a plurality of zones when a predetermined triggering event occurs. For example, the triggering event may be the changing of the zone of greatest error or demand from an "on" condition to an "off" condition, from an "off" condition to an "on" condition, or the changing of the zone of greatest error or demand from a first zone to a second zone. The synchronizing mechanism may set the on/off cycles of a plurality of zones to the beginning of either the "on" cycle or the "off" cycle.

Other objects and advantages of the present invention will be apparent from the following description of a preferred embodiment thereof and from the attached drawing.

DETAILED DESCRIPTION OF THE INVENTION

Figure 1:
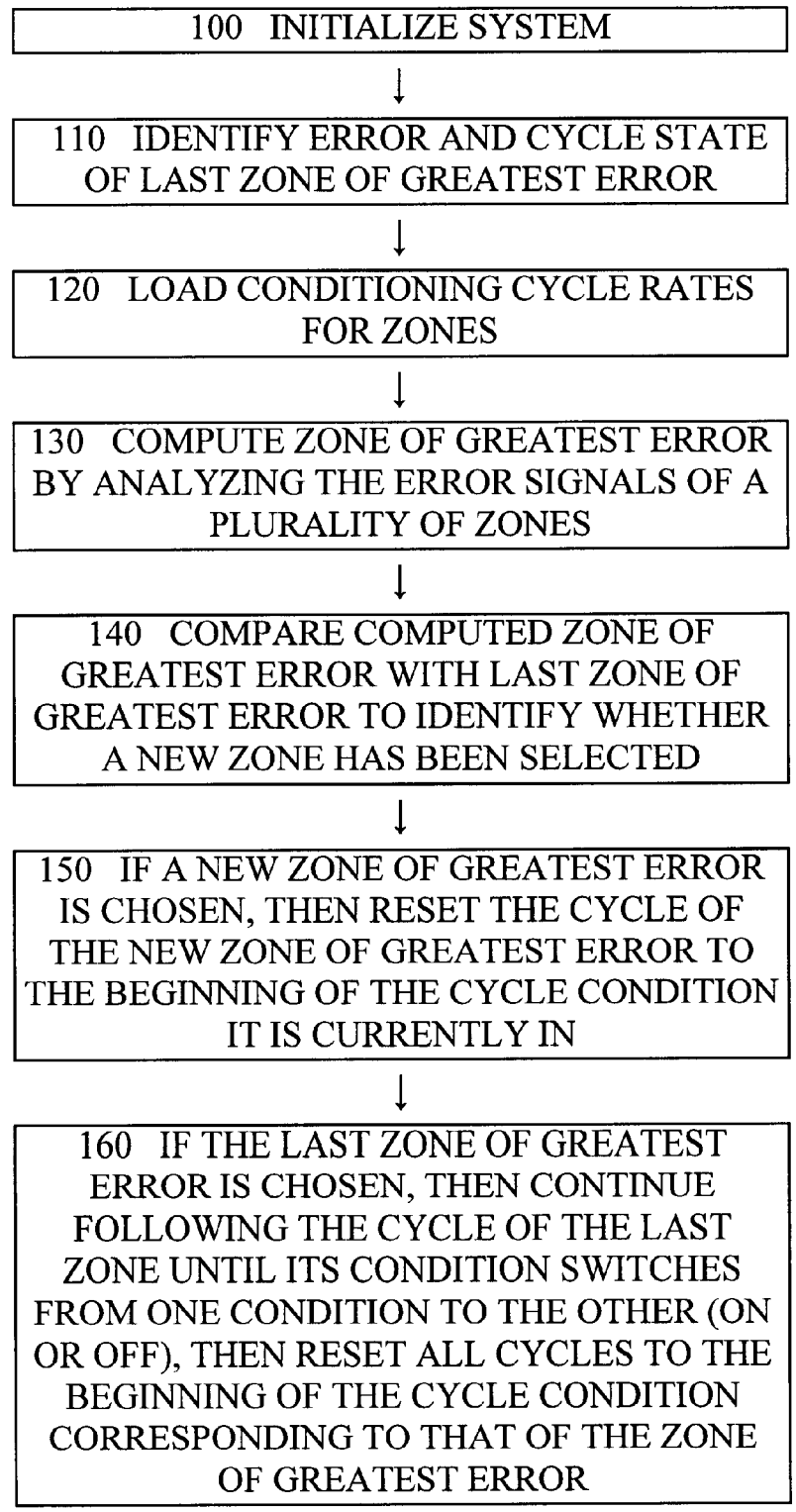
FIG. 1 is a block diagram showing the protocol followed by the controller in one embodiment of the present invention.

As stated above, the present invention further refines the idea of utilizing zone control to reduce the run time of a conditioning device and to further reduce the amount of short breaks between running periods. The initial concepts of defining the zone of greatest demand, or greatest temperature error, were disclosed in U.S. Pat. Nos. 5,024,265 and 5,318,104. The principles taught in these references are useful in understanding the present invention and, therefore, the subject matter thereof is incorporated by reference.

The present invention includes a controller, multiple zone control apparatus, and method for controlling temperature independently in a plurality of zones of a structure having an interior divided into a plurality of zones. The present invention may be implemented in any structure, such as in residential and commercial buildings, having spaces, often referred to as zones, wherein different temperatures are desired. The controller is constructed and arranged to control the temperature in each zone by actuating a temperature-affecting device to communicate a temperature conditioned fluid to the zone. A temperature-affecting device may be any device that can change the temperature of a fluid. Some examples of suitable devices include furnaces, air conditioners, fireplaces, air and water heat pumps, and the like. The fluid may also be any suitable fluid known in the art. For example, gases, such as air, and liquids, such as water, or chemical based liquid solutions, and the like are some suitable fluids.

The controller is constructed and arranged to determine a zone temperature error for each of the zones based upon the difference between a predetermined temperature and the temperature represented by a signal sent from a sensor located in the zone in which the error is to be determined. The controller may be a single centralized control module that receives data from the sensors in each zone and/or controls the functions of the temperature effecting device and/or the dampers or valves utilized. Under this scheme, the controller may simply compare the errors of the plurality of zones and determine which zone has the greatest error. In one embodiment, the controller can reset the cycles of the other zones to coincide with the current state of the zone of greatest error.

Alternatively, the controller may be comprised of a number of controllers that communicate between each other. Under one such embodiment, each zone has a controller monitoring and controlling its status and processing its specific data. Each of these controllers is interconnected with the other controllers, which allow the plurality of controllers to determine the error and cycle state in the zone of greatest error and to, thereby, coordinate the flow of fluid into each zone efficiently by aligning the cycles of the other zones with that of the zone of greatest error. The controllers are constructed and arranged to periodically review the error and cycle state of the zone of greatest error from which they are to take their cues. The controller may be any device or combination of devices known in the art that can achieve the necessary functions described herein. For example, the controller may be comprised of one or more integrated circuits or computers.

The sensor may be located in any part of the zone or may be located outside the zone, so long as the temperature of the zone can be ascertained, and may communicate a signal in any manner known in the art. For example, the sensor may communicate by through the air by means, such as radio waves or the like; or by electricity or light through cables, guides, or the like and the sensor may be located outside the zone and, for example, use infra-red technology, measure air returned from that space, or use indirect clues to estimate the temperature. Preferably, the sensor utilizes cabling connected between the sensor and the controller to transmit the signal by electrical impulses.

The controller also is constructed and arranged to compare the errors of a plurality of zones to determine the error in the zone of greatest error. This is accomplished by having a predetermined target temperature for a zone and comparing the actual temperature sensed by the sensor within the zone to the target temperature. The target temperature may be a static preset temperature that may be set manually by a user or programmed into the controller. Alternatively, the target temperature may be adjustable according to time or to a change in the temperature in the zone due to external forces, such as people entering the zone or a door or window that has been opened.

The controller controls the activation of the one or more conditioning devices utilized by the structure to change the temperature within each of the zones. For example, with regard to the use of a heating device, when the temperature in a zone is sensed by the sensor to be lower than the target temperature, the difference between the sensed temperature and the target temperature is the temperature error of the zone.

In a single zone system the conditioning device can be activated when the error reaches a certain predetermined level to heat the room to the target temperature. In a multiple zone structure, the controller must dictate when to actuate the conditioning device in order to most efficiently transfer conditioned fluid to the plurality of zones.

Traditionally, the multiple zone devices would receive requests from each zone and actuate the conditioning device to respond to any request received. The present invention attempts to synchronize a plurality of the zones needing conditioned fluid to the request of a single zone. The present invention identifies the error and conditioning state in the zone where its actual temperature is the furthest from target temperature and uses it to dictate when the conditioning device is to be actuated. Synchronization is accomplished by determining the error and cycle state in the zone of greatest error.

This construction attempts to reduce the amount of short cycles produced by a control device's attempts to control or react to all of the zones at once. The present invention also reduces the number of cycles that the conditioning unit supplies conditioned fluid to the spaces. These activities are accomplished by resetting the cycles of the different zones needing conditioning to take advantage of the conditioning device when it is actuated.

Additionally, in some systems, the controller must also determine to which zones the conditioned fluid will be sent. This function is typically accomplished through the use of valves and/or dampers that may be controlled by the controller. The dampers and/or valves have an open condition wherein fluid is allowed to flow to the zone or zones to which it is connected and a closed condition wherein fluid is restricted from flowing to the zone or zones to which it is connected. The controller can synchronize the condition of the dampers or valves when it is triggered by an event and can thereby control the amount of fluid transferred to each of the plurality of zones to which the dampers and/or valves are connected. It should be noted that the term "damper" within the claims shall be defined as including either dampers or valves.

Generally, the controllers in these devices have a predetermined on/off cycle for each zone for actuating the temperature-affecting device, such that when the cycle is in an "on" condition, the temperature-affecting device communicates fluid to the zone, and when the cycle is in an "off" condition, the device does not communicate fluid to the zone. However, the controller can affect the amount of fluid sent and, thereby, and thereby, can control the amount of fluid communicated in either a gradual or drastic manner by controlling the dampers and valves to each zone independently. Alternatively, the controller can also treat all zones the same by equally actuating the dampers and valves if such an application is necessary.

The present invention provides a controller that is constructed and arranged to actuate the temperature-affecting device when the on/off cycle of the zone of greatest error dictates such actuation. The controller also has a synchronizing mechanism to synchronize the on/off cycles of a plurality of zones when a predetermined triggering event occurs. The synchronizing mechanism can be any means known in the art for synchronizing the cycles of the different zones, and includes, for example, computer software protocols, electrical and mechanical switches, and the like. Additionally, one synchronizing mechanism may be utilized to synchronize a plurality of cycles of the zones or the synchronizing mechanism may be comprised of a plurality of modules each synchronizing one or more cycles of the zones.

In one embodiment, the triggering event may be the changing of the zone of greatest demand from an "on" condition to an "off" condition. In this case, all of the cycles of the plurality of zones are reset to the beginning of their "off" cycles.

The triggering event may also be when the cycle of the zone of greatest error changes from an "off" condition to an "on" condition. At this time, all of the cycles of the plurality of zones are reset to the beginning of their "on" cycles. It is preferred under these criteria that all zones that are in need of conditioning should be set at the beginning of their "on" cycle. In this way, all zones needing conditioning will receive conditioned fluid while the "on" cycle of the zone of greatest error is in its "on" cycle.

Zones needing conditioning can be identified by looking at the error of the zone. The analysis of whether a zone is in need of conditioning may be determined by any method known in the art. For example, under a heating scenario, if when the actual zone temperature is subtracted from the target temperature, a positive number is the result, and the zone is in need of conditioning. Under a cooling scenario, if when the actual temperature is subtracted from the target temperature, a negative number results, then the zone is in need of conditioning.

Further, the triggering event may be the changing of the zone of greatest demand from a first zone to a second zone. In this case, the cycle of the new zone of greatest demand is reset to the beginning of its cycle. In this way, if the new zone becomes the zone of greatest demand near the end of its "on" cycle, the conditioning device will not be turned on and off in a short period, but rather the cycle will be reset and the conditioning device will be actuated through the entire "on" cycle of the new zone of greatest error or until a new zone of greatest error is identified. The synchronizing mechanism may set the on/off cycles of a plurality of zones to the beginning of either the "on" cycle or the "off" cycle. Therefore, the device may be set to take advantage of the longest running times or the longest off times or may be set to take advantage of both.

Two examples of the present invention are provided below, one embodiment having a single controller and the second embodiment having a plurality of controllers. In an embodiment of a single controller system, the controller receives information from the sensors and from that information can determine the error. The sensors may simply provide the error to the controller or the controller can do the computation based upon raw data received from the sensors. Additionally, the controller can determine the zone of greatest error by comparing the errors for the computed zones. The computation for identifying the zone of greatest error can be achieved by any means known in the art. One example of a suitable means is to compare all of the zones at the same time and identify the zone of greatest error.

In a multiple controller scenario, the controllers all work together to identify the zone of greatest error, which will dictate the cycle synchronization. The communication and decision of the zone of greatest error can be accomplished by any means known in the art. For example, in one embodiment, each controller is capable of requesting a calculation of the zone of greatest error. The controllers may be constructed to make a request for one or more circumstances depending upon its desired use. For example, when a zone has a sudden change in temperature, when a predetermined time period has expired, and other such circumstances would be suitable for times to initiate a request. Once a request is made, the controller sends its error to each of the other controllers and receives the errors from the other controllers. Each controller can then compare its error with all of the other controllers' errors to determine whether it is the zone of greatest error. If it is not, then it takes direction from the zone that has the greatest error. If it is the zone of greatest error, it resets its cycle and begins sending commands to the other controllers. It should be noted that, although the controllers can be programmed to identify which specific zone is the zone of greatest error, it is not necessary for each zone to know which zone is the zone of greatest error, but rather, that the zone they control is or is not the zone of greatest error, and therefore, the controller either sends commands or follows the zone of greatest error.

Additionally, a sample protocol for the controller is shown in FIG. 1. As shown at 100, when the controller is first initiated, the device may be programmed to run an initialization procedure. This may be utilized to run diagnostics or simply to load the program functions that may be utilized.

The controller may also be equipped to retain the error and cycle state of the last zone of greatest demand as indicated in element 110 of the figure. This allows the device to assign a zone of greatest demand cycle state prior to doing any analysis of the zone errors. Further, the controller may load predetermined conditioning on/off cycle rates that provide the controller with a pattern of on/off conditions to apply to each zone, as shown in element 120. The errors of the zones are then computed by comparing the target temperatures to the actual temperature sensed in each of the zones and the error in the zone of greatest demand is identified by comparison of the errors. Once a zone of greatest demand is identified, it is compared with the last zone of greatest demand to identify whether the computed zone of greatest demand is the same as the last zone of greatest demand.

Elements 150 and 160 in the figure represent two options that may occur and, therefore, may be addressed either sequentially, as shown in FIG. 1, or in parallel. Element 150 provides an embodiment wherein if a new zone of greatest demand is chosen, then the current condition of the cycle of the new zone of greatest demand is reset to the beginning of the cycle condition it is currently in.

However, as shown in element 160 if the last zone of greatest error is chosen, then the controller continues following the cycle of the last zone until its condition switches from one condition to the other (on or off), then the controller resets all of the cycles to the new condition to which the controller has switched. In a further embodiment, when the zone of greatest error switches from "off" to "on", only the zones that indicate a need for conditioning are reset to the beginning of the "on" cycle condition. Although FIG. 1 is only an example of one embodiment of the invention, it does show how the synchronization can be employed to a specific application requiring specific features.

Having illustrated and described the principles of the invention in a preferred embodiment, it should be apparent to those skilled in the art that the invention can be modified in arrangement and detail without departing from such principles. Specifically, it should be noted that the present invention may be constructed and arranged as a forced air system, but is equally applicable to a liquid based system, such as hydronic systems and the like, wherein a fan is a pump, ducts are pipes, zone dampers are valves and duct damper actuators are valve actuators. Other such equivalent structures known in the art are treated as equivalents herein. We claim all modifications coming within the spirit and scope of the following claims.

What is claimed is:

1. In a multiple zone control apparatus, for use for controlling temperature independently in each of a plurality of zones, a controller comprising:

a controller constructed and arranged to control the temperature in a plurality of said zones by actuating a temperature-affecting device to communicate a temperature conditioned fluid to at least one said zone, said controller constructed and arranged to determine a zone temperature error for a said zone based upon the difference between a predetermined target temperature and the temperature represented by a signal sent from a sensor located in said zone, said controller also constructed and arranged to compare the errors of a plurality of zones to determine the error in the zone of greatest error, said controller further having a predetermined on/off cycle for a said zone for actuating said temperature-affecting device such that when said cycle is in an "on" condition, said temperature-affecting device communicates fluid to said zone and when said cycle is in an "off" condition, said device does not communicate fluid to said zone, said controller constructed and arranged to actuate said temperature-affecting device when said on/off cycle of said zone of greatest error dictates such actuation, said controller also comprising a synchronizing mechanism to synchronize the start of the off cycles of a plurality of said zones when a predetermined triggering event occurs, said triggering event comprising the zone of greatest error cycling from its "on" condition to its "off" condition.

2. A controller according to claim 1, including apparatus for determining from the zone temperature error for that zone, when a zone is in need of conditioning, and wherein said plurality of zones to be synchronized are zones indicating a need for conditioning.

3. A controller according to claim 1, wherein said controller periodically determines the zone of greatest error by comparing the errors of a plurality of zones and wherein said triggering event includes the zone of greatest error switching from a first zone to a second zone, and wherein when said second zone is in its "on" condition during such switching, said synchronizing mechanism synchronizes the on/off cycle of said second zone to the beginning of said second zone's "on" cycle.

4. A controller according to claim 1, wherein said controller periodically determines the zone of greatest error and wherein said triggering event includes the zone of greatest error switching from a first zone to a second zone, and wherein when said second zone is in its "off" condition during such switching, said synchronizing mechanism synchronizes the on/off cycle of said second zone to the beginning of said second zone's "off" cycle.

5. A controller according to claim 1, wherein said fluid is a gas.

6. A controller according to claim 1, wherein said fluid is a liquid.

7. A controller according to claim 1, wherein said apparatus further comprises one or more dampers, each said damper constructed and arranged to restrict the communication of fluid to a zone, said dampers each having an open condition wherein fluid is allowed to flow to said zone and a closed condition wherein fluid is restricted from flowing to said zone, said controller constructed and arranged to control the actuation of said one or more dampers from said open condition to said closed condition.

8. A controller according to claim 1, wherein said controller is comprised of a plurality of control modules that are constructed and arranged to communicate with each other, to identify the error and cycle state in zone of greatest error.

9. A controller according to claim 1, wherein said controller is comprised of a plurality of control modules that are constructed and arranged to communicate with each other, each controller constructed and arranged to control a zone and to compare the error of their zone with the error of the other zones to determine whether their zone has the greatest error.

10. A controller according to claim 1, wherein said controller periodically determines the zone of greatest error and wherein said triggering event includes the zone of greatest error switching from a first zone to a second zone, and wherein when said second zone is in its "on" condition said synchronizing mechanism synchronizes the on/off cycle of said second zone the beginning of said "on" cycle of said second zone.

11. A controller according to claim 1, wherein said controller periodically determines the errors of the zones to determine the zone of greatest error and wherein said triggering event includes the zone of greatest error switching from a first zone to a second zone, and wherein when said second zone is in its "off" condition said synchronizing mechanism synchronizes the on/off cycle of said second zone to the beginning of said "off" cycle of said second zone.

12. A controller according to claim 1, wherein said triggering event is when the on/off cycle of said zone of greatest error cycles from its "on" condition to its "off" condition, and wherein said synchronizing mechanism synchronizes the on/off cycles of a plurality of said zones to the beginning of each said zone to be synchronized "off" cycle.

13. A multiple zone control apparatus for use with a plurality of zones, for controlling temperature independently in each zone, comprising:

a sensor located in each said zone, each said sensor generating a signal representing the temperature within the zone in which said sensor is located;

a temperature-affecting device connected to each said zone for effecting the temperature of each said zone by communication of a temperature conditioned fluid from said device to each said zone;

and a controller constructed and arranged to control the temperature in a plurality of said zones by actuating said temperature-affecting device to communicate a temperature conditioned fluid to one or more of said plurality of zones, said controller constructed and arranged to determine a zone temperature error for a said zone based upon the difference between a predetermined temperature and the temperature represented by said signal, said controller also constructed and arranged to compare the errors of a plurality of zones to determine the zone of greatest error, said controller further having a on/off cycle for a said zone for actuating said temperature-affecting device such that when said cycle is in an "on" condition, said temperature-affecting device communicates fluid to said zone and when said cycle is in an "off" condition, said device does not communicate fluid to said zone, said controller constructed and arranged to actuate said temperature-affecting device when said on/off cycle of said zone of greatest error dictates such actuation, said controller also comprising a synchronizing mechanism to synchronize the on/off cycles of a plurality of said zones when the zone of greatest error cycles from its "on" condition to its "off" condition.

* * * * *